(12) United States Patent
Ansorregui et al.

(10) Patent No.: US 12,307,548 B2
(45) Date of Patent: May 20, 2025

(54) IMAGE PROCESSING

(71) Applicant: Samsung Electronics Co., Ltd., Suwon-si (KR)

(72) Inventors: Daniel Ansorregui, Staines (GB); Karthikeyan Saravanan, Staines (GB); Albert Saa-Garriga, Staines (GB); Cristian Szabo, Staines (GB); Frederik Laboyrie, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 18/160,619

(22) Filed: Jan. 27, 2023

(65) Prior Publication Data
US 2023/0169622 A1 Jun. 1, 2023

Related U.S. Application Data

(63) Continuation of application No. PCT/KR2022/011928, filed on Aug. 10, 2022.

(30) Foreign Application Priority Data

Nov. 29, 2021 (GB) ...................... 2117160

(51) Int. Cl.
*G06T 1/60* (2006.01)
*A63F 13/52* (2014.01)
(Continued)

(52) U.S. Cl.
CPC ............. *G06T 1/60* (2013.01); *G06T 1/20* (2013.01); *G06T 11/001* (2013.01); *A63F 13/52* (2014.09); *A63F 13/533* (2014.09)

(58) Field of Classification Search
CPC . G06T 1/60; G06T 1/20; G06T 11/001; A63F 13/52; A63F 13/533; A63F 2300/6692
(Continued)

(56) References Cited

U.S. PATENT DOCUMENTS

| 8,111,260 B2 | 2/2012 | Srinivasan et al. |
| 9,280,845 B2 | 3/2016 | Balci et al. |

(Continued)

FOREIGN PATENT DOCUMENTS

| JP | 5154551 B2 | 2/2013 |
| KR | 10-2015-0041972 A | 4/2015 |

(Continued)

OTHER PUBLICATIONS

David Szabo et al., 'Vulkan in C# for Multi-Platform Real-Time Graphics', 2020 18th International Conference on Emerging eLearning Technologies and Applications (ICETA), pp. 687-692, Nov. 12-13, 2020.
(Continued)

*Primary Examiner* — Prabodh M Dharia
(74) *Attorney, Agent, or Firm* — Jefferson IP Law, LLP

(57) ABSTRACT

Image processing comprises receiving content from an application; rendering the content into a rendered frame and storing the rendered frame in a frame buffer; transferring the rendered frame from the frame buffer to a compositor, and displaying the rendered frame using the compositor. The image processing further comprises applying a non-linear transformation to at least part of the rendered frame during the rendering the content into the rendered frame; during the transferring of the rendered frame to the compositor, or during the displaying of the rendered frame by the compositor.

15 Claims, 14 Drawing Sheets

(51) Int. Cl.
*A63F 13/533* (2014.01)
*G06T 1/20* (2006.01)
*G06T 11/00* (2006.01)

(58) Field of Classification Search
USPC .......................................... 345/604; 725/112
See application file for complete search history.

(56) References Cited

U.S. PATENT DOCUMENTS

| | | | |
|---|---|---|---|
| 10,169,839 B2 | 1/2019 | Kim et al. | |
| 10,181,298 B2 | 1/2019 | Shoshan et al. | |
| 10,271,054 B2 | 4/2019 | Greenebaum et al. | |
| 10,835,819 B2 | 11/2020 | Gault et al. | |
| 11,182,884 B2 | 11/2021 | Deng et al. | |
| 12,086,919 B2* | 9/2024 | Zhang | G06F 1/163 |
| 2008/0152219 A1 | 6/2008 | Ramanath et al. | |
| 2015/0102996 A1 | 4/2015 | Yim et al. | |
| 2015/0206269 A1* | 7/2015 | Qin | G06T 1/20 |
| | | | 725/112 |
| 2015/0304640 A1* | 10/2015 | Brooks | H04N 13/122 |
| | | | 348/56 |
| 2016/0205371 A1 | 7/2016 | Wallace et al. | |
| 2017/0061926 A1 | 3/2017 | Bhattacharjee | |
| 2019/0014330 A1 | 1/2019 | Ramasubramonian et al. | |
| 2019/0073741 A1* | 3/2019 | Herring | G06T 1/20 |
| 2019/0295323 A1* | 9/2019 | Gutierrez | G02B 27/017 |
| 2019/0325613 A1 | 10/2019 | Wu et al. | |
| 2020/0022632 A1* | 1/2020 | Lewis | A61M 21/00 |
| 2020/0023157 A1* | 1/2020 | Lewis | A61B 5/369 |
| 2020/0035205 A1 | 1/2020 | Nishibe et al. | |
| 2020/0368616 A1 | 11/2020 | Delamont | |
| 2020/0410740 A1 | 12/2020 | Croxford et al. | |
| 2021/0160468 A1 | 5/2021 | Peuhkurinen et al. | |
| 2022/0261951 A1* | 8/2022 | Renschler | G09G 5/001 |
| 2022/0351343 A1* | 11/2022 | Rassool | G06T 5/40 |

FOREIGN PATENT DOCUMENTS

| | | |
|---|---|---|
| KR | 10-1721861 B1 | 3/2017 |
| KR | 10-2017-0040698 A | 4/2017 |
| KR | 10-2000618 B1 | 10/2019 |

OTHER PUBLICATIONS

United Kingdom Combined Search and Examination Report dated Jun. 8, 2022, issued in GB Patent Application No. 2117160.8.
International Search Report and Written Opinion dated Dec. 5, 2022, issued in International Patent Application No. PCT/KR2022/011928.
British Examination Report dated Jun. 27, 2024, issued in United Kingdom Patent Application No. GB2117160.8.

* cited by examiner

1102

1104

IMAGE PROCESSING

CROSS-REFERENCE TO RELATED APPLICATION(S)

This application is a continuation application, claiming priority under § 365(c), of an International application No. PCT/KR2022/011928, filed on Aug. 10, 2022, which is based on and claims priority of a United Kingdom patent application number 2117160.8, filed on Nov. 29, 2021, in the United Kingdom Intellectual Property Office, the disclosure of which is incorporated by reference herein in its entirety.

BACKGROUND

1. Field

The present invention relates to image processing, in particular applying a non-linear transformation to at least part of an image.

2. Description of Related Art

Many image-related processes use various kinds of non-linear transformations. In general, a non-linear transformation is one that changes content based on an equation that depends on the content itself, e.g. out=f(in)+C, such as out(y,x)=in(y,x)−in(y−1,x)+in(y+1,x)−in(y,x−1)+in(y,x+1). Examples of image processing functions that use a non-linear transformation include sharpen, increase contrast and colour swapping. Examples of functions that do not involve a non-linear transformation include brightness change, colour tone change (e.g. blue light filter), invert colours and remove colours. All linear transformations can be implemented using a non-linear transformation, but not vice versa.

In computing scenarios there are many cases where a non-linear transformation is required. For instance, the mobile operating systems Android™ and iOS™ offer a night mode that changes the colour palette of apps from white to black whilst keeping other colours the same (a non-linear transformation). This is done by the app itself to its internal palette, but is applied only to UI elements and not to images generated by applications such as games or video players. As another example, with LED display technology darker colours have lower power usage. When turning on a battery saver function on a mobile device the night mode is turned on. There is a need to apply night mode to live image content such as games and video without using more power on the night mode filter than is saved by having the display in the night mode. In the specific example of gaming, applications such as Nvidia's FreeStyle™ offer users personal customization of a game's appearance by applying real-time post-processing filters. However, these can degrade performance significantly on desktop PCs and are unfeasible on mobile devices due to resource constrains.

Therefore, there are many cases, especially on mobile computing devices, where non-linear transformations are required but are not currently used due to resource restrictions. When power save mode is applied, e.g. in Android™ or iOS™, the OS reduces brightness, which can result in a degradation of experience for the user. Non-linear transformations could be used, but would result in extra power usage, thereby defeating the purpose of the power save mode and so current techniques are limited to reducing brightness using a linear transform. Games in particular have high power/computational demands, where power saving is considered critical. However, additional computationally expensive functions, such as applying non-linear transformations, can reduce performance in an unacceptable manner.

SUMMARY

Embodiments of the present invention can address at least some of the above technical problems.

According to an aspect of the present invention there is provided a computer-implemented method of image processing, the method comprising: receiving content from an application; rendering the content into a rendered frame and storing the rendered frame in a frame buffer; transferring the rendered frame from the frame buffer to a compositor, and displaying the rendered frame using the compositor, wherein the method further comprises applying a non-linear transformation to at least part of the rendered frame during the rendering the content into the rendered frame; during the transferring of the rendered frame to the compositor, or during the displaying of the rendered frame by the compositor.

The applying the non-linear transformation to at least part of the rendered frame during the rendering may comprise: rendering the content into the rendered frame using a rendering function of a (e.g. OS-side) library called by the application (e.g. via an API, and typically using a GPU), and storing the rendered frame in the frame buffer; applying the non-linear transformation to at least part of the rendered frame stored in the frame buffer, wherein the non-linear transformation is applied using code for performing the non-linear transformation injected into the rendering function of the library.

The library may comprise OpenGL™ and the code may be injected using shaders. For example, the rendering function of the library may comprise FinalRenderPass, which can write the rendered frame to tile memory; the non-linear transformation can be applied to the rendered frame, and a resulting swapchain image can be stored in the frame buffer/DRAM.

The library may comprise GLES™ and the code may be injected by: intercepting a last framebuffer that renders to swapchain, and injecting a full screen draw-call before completing the rendered frame.

The injected draw-call can read a last pixel value from the tile memory and apply the non-linear transformation using a GLES Extension, e.g. ARM_shader_framebuffer_fetch.

The library may comprise Vulkan™ and the code may be injected using multipass. For example, the code may be injected by: intercepting a last renderpass rendering function of the library that renders the rendered frame as a swapchain image, and injecting a new subpass rendering function before completing the renderpass.

Objects created by the application that are dependent on the injected code can be recreated, e.g. using VkRenderPass, VkFramebuffer, VkPipeline. The injected new subpass rendering function can read a last pixel value from the tile memory and apply the non-linear transformation using multipass attachments.

The method may comprise determining that the applying the non-linear transformation during the rendering is not possible and then determining whether the applying the non-linear transformation is possible during the displaying of the rendered frame by the compositor.

The applying the non-linear transformation during the displaying of the rendered frame by the compositor may comprise: receiving the rendered frame from the frame buffer; configuring a hardware unit of the compositor to apply the non-linear transformation to the rendered frame.

The configuring the hardware unit of the compositor to apply the non-linear transformation may comprise: adding instructions for applying the non-linear transformation to the rendered frame in a BuildLayerList in Android Surfaceflinger™ for execution using BuildTransform in Android Surfaceflinger™.

The hardware units may comprise alpha blending, addition, scale, blend, rotate, adding, etc.

The method may comprise: determining that the applying the non-linear transformation during the rendering is not possible, and then determining that the applying the non-linear transformation during the displaying of the rendered frame by the compositor is also not possible, and then applying the non-linear transformation during the transferring of the rendered frame to the compositor.

The step of applying the non-linear transformation during the transferring of the rendered frame to the compositor may comprise: applying the non-linear transformation to the rendered frame stored in the frame buffer; placing the transformed rendered frame into a further storage area (e.g. a further compositor queue), and transferring the transformed rendered frame from the further storage area to the compositor.

The non-linear transformation may comprise selecting a value from at least one look-up table or similar data structure(s). The at least one look-up table may be configured to transformation a colour space of the application to a target colour space, e.g. a colour space (or style) of another application or a night mode function. The look-up table may be configured to transform a colour space of the application to a colour space that maximises contrast and minimizes colour power. The look-up table may be created by receiving data describing a colour space of an application (e.g. a game) and recursively assign the colours to the target colour space by similarity of distribution. The non-linear transformation may comprise a function based on at least one neighbouring pixel of a pixel in the frame and a set of weights. The weights may be trained using a Machine Learning technique. The non-linear transformation may comprise a style transfer operation based on a reference image, which may be selected via user input.

The method may be performed by a mobile computing device. At least the rendering function may be performed by a GPU of the device.

The application may comprise a game or video player/generator. The method may be invoked via a Game Mode user interface on the Android™ operating system. The method may further comprise receiving user input to select the non-linear transformation, e.g. from a plurality of predetermined options. The user input may be received using a Game Mode UI. The user input may allow a user to select among a set of predefined transformations. The user input may allow a user to provide/select a reference image and information regarding the reference image can be incorporated as values used in the non-linear transformation to perform style transfer image processing on the rendered frame.

According to another aspect of the present invention there is provided a (typically mobile) computing device configured to perform methods substantially as described herein.

According to another aspect of the present invention there is provided a computer readable medium storing a computer program to operate methods substantially as described herein.

According to the present invention, there is provided a method and apparatus as set forth in the appended claims. Other features of the invention will be apparent form the dependent claims, and the description which follows.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION

Figure 1:
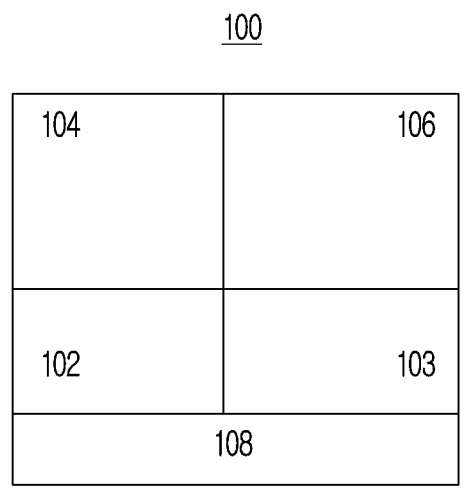
FIG. 1 is a block diagram of a computing device configurable to execute embodiments of the invention.

FIG. 1 is a block diagram of a computing device 100 configurable to execute embodiments of the invention. The device will normally comprise, or be associated with, a Central Processing Unit (CPU) 102, a Graphics Processing Unit (GPU) 103, a memory 104 and a communications interface 106. The interface can provide data communication between the device and other devices/components via a wireless internet connection, a cellular network connection, or the like. The computing device can comprise a mobile computing device, such as a mobile smartphone, tablet computer or handheld gaming device. The computing device may further include a user component interface 108, such as a touchscreen. Other components and features of the device, such as a display, audio output, etc., will be well-known to the skilled person and need not be described herein in detail.

Figure 2:
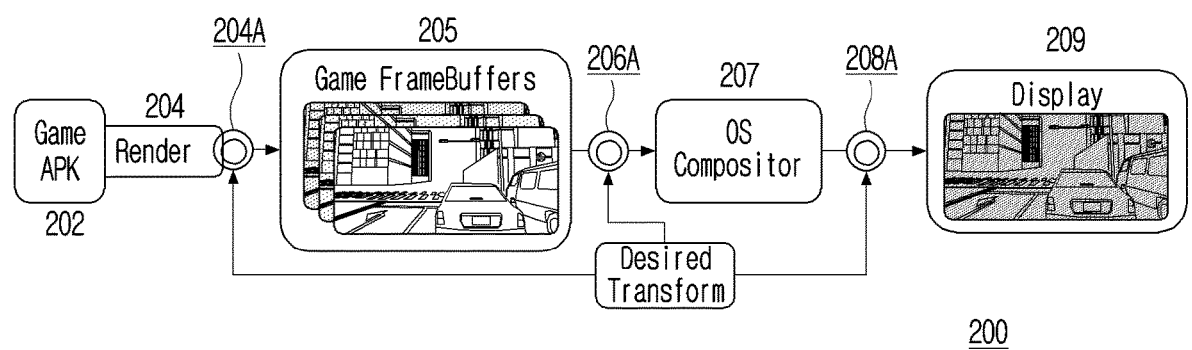
FIG. 2 is a diagram summarising steps performed by the computing device according to an embodiment.

FIG. 2 is a schematic illustration of an example method 200 according to an embodiment and shows steps performed by means of software instructions being executed by the computing device 100. It will be appreciated that at least one of the steps described herein may be re-ordered or omitted. One or more additional steps may be performed in some cases. Further, although the steps are shown as being performed in sequence in the Figures, in alternative embodiments some of them may be performed concurrently, possibly on different processors or cores. It will also be understood that embodiments can be implemented using any suitable software, programming language, data editors, etc., and may be represented/stored/processed using any suitable data structures and formats.

The method 200 can be initiated in various ways. For example, it can be initiated when an application 202, such as a game or video generator, executing on the device 100 generates live content that is to be displayed as a rendered image. The application may use an Application Programming Interface, API, to interface with a library (not shown) of re-usable code that can be used for performing certain operations, e.g. rendering frames. The library may utilize the GPU 103 of the computer 100 where appropriate for improved performance. Embodiments can be based on a pipeline design, as shown in FIG. 2, and are able to apply dynamic non-linear transformations to live content (e.g. game, video) whilst preserving performance in resource constrained scenarios, such as in mobile computing devices.

When the application 202 needs to render 204 content, it can do so to a surface/buffer/memory 205 so that the rendered image can be later transferred to a compositor 207 that places and displays 208 the rendered image on the display 209. Without altering the code of the application, embodiments can modify the rendered image by applying one or more non-linear transformation at a certain point in the pipeline. In particular, embodiments can apply the transformation at one of the following points: during (illustrated by 204A) a process that renders the content into a rendered image/frame; during (illustrated by 206A) transfer of the rendered image from the frame buffer to the compositor, or before the rendered image (received from the frame buffer) is displayed (illustrated by 208A) using the compositor. Embodiments can apply more than one (different) non-linear transformations to a frame, or even apply different transformations to different parts of a frame.

Figure 3:
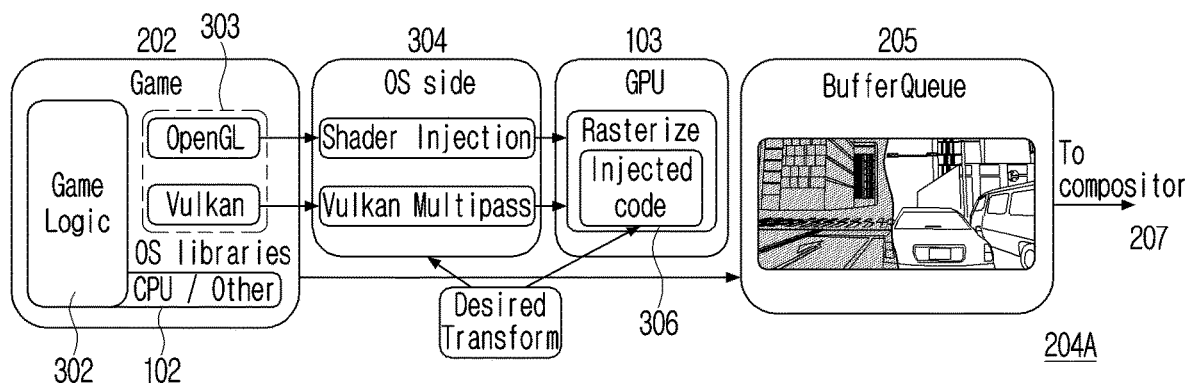
FIG. 3 schematically illustrates an embodiment that applies a non-linear transformation to at least part of the rendered frame during the rendering of the content.

FIG. 3 schematically illustrates an embodiment that applies the non-linear transformation at point 204A of the pipeline shown in FIG. 2, i.e. during rendering 204A of the content into a rendered frame/image, typically making use of the GPU 103 for improved performance. The application 202 comprises code/logic 302 that can use an API 303 to interface with one or more OS-side libraries 304 that contain a function for rendering frames. Common examples of such libraries include OpenGL™ 304A and Vulkan™ 304B (both are shown in the Figure, but it will be understood that only one will typically be used). Even applications that use Java™-side UI elements usually end up using HWUI™ and ultimately Vulkan™ for rendering. As will be described below, injected code 306 can be used in connection with the library 304 so that the transformation can be applied during a rendering/rasterization 308 function. The resulting rendered frame is then placed in the frame buffer/queue 205, ready for transfer to the compositor 207.

In some embodiments OpenGL™ shaders that the application 202 calls can have the transformation(s) injected into their code. In other embodiments the Vulkan™ pipeline can be modified with an additional "multipass" to execute the transformation(s). These embodiments apply the transformation at the same time as the frame/image is being rendered and so can exploit data locality in the GPU itself. Tests have indicated that applying the transformation in this manner accounts for 1% of device power and should not have any noticeable impact on performance for the user.

Figure 4A:
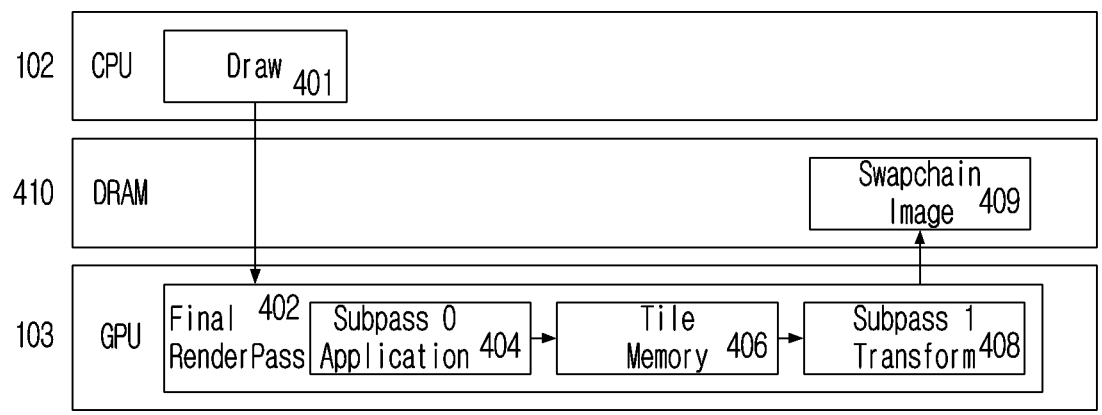
FIGS. 4A and 4B further detail applying the non-linear transformation during the rendering of the content.

FIG. 4A schematically illustrates an efficient implementation of the applying of the non-linear transformation at step 204A that uses the tile memory available on Tile-Based Deferred Rendering (TBDR) architectures. This restricts the transformation to per pixel only operations (as neighbourhood data is not available), but an advantage is that tile memory is fast and has no memory bandwidth cost. The application 202 issues a Draw command 401 that is executed by the CPU 102 of the computing device 100, which results in the library function FinalRenderPass 402 being called, which is executed by the GPU 103. This involves Subpass 0 application 404 writing the rendered image to tile memory 406. The non-linear transformation 408 can be applied to the rendered image as Subpass 1 and the resulting swapchain image 409 is stored in DRAM 410, ready to be transferred to the compositor 207 when required. Subpass 0 writes the pixel value to the tile memory and subpass 1 reads the pixel value, applies the transform and writes to DRAM. This technique is conventionally used for deferred rendering.

Figure 4B:
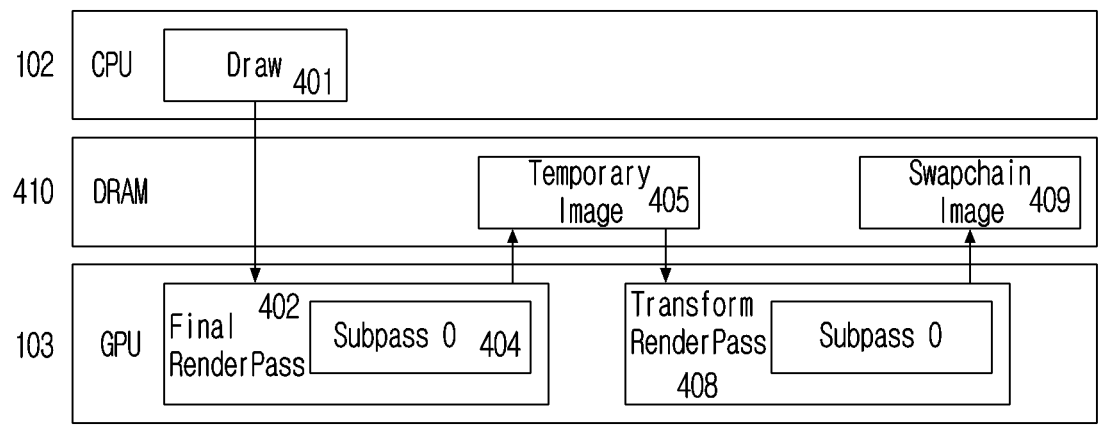

FIG. 4B schematically illustrates an alternative embodiment where the transformation is applied in a separate renderpass. This can allow any kind of operation (reading neighbourhood data is possible), but read/write memory to DRAM is expensive in terms of power (e.g. around 100 mW/GB/s). The application 202 issues a Draw command 401 that is executed by the CPU 102 of the computing device 100, which results in the library function FinalRenderPass 402 being called and executed using the GPU 103. This involves Subpass 0 404 generating and writing a temporary rendered image 405 to the DRAM 410 and the non-linear transformation 408 can be applied to it using Subpass 0. The resulting swapchain image 409 is stored in the DRAM 410, where it can be transferred to the compositor 207 when required.

Figure 5A:
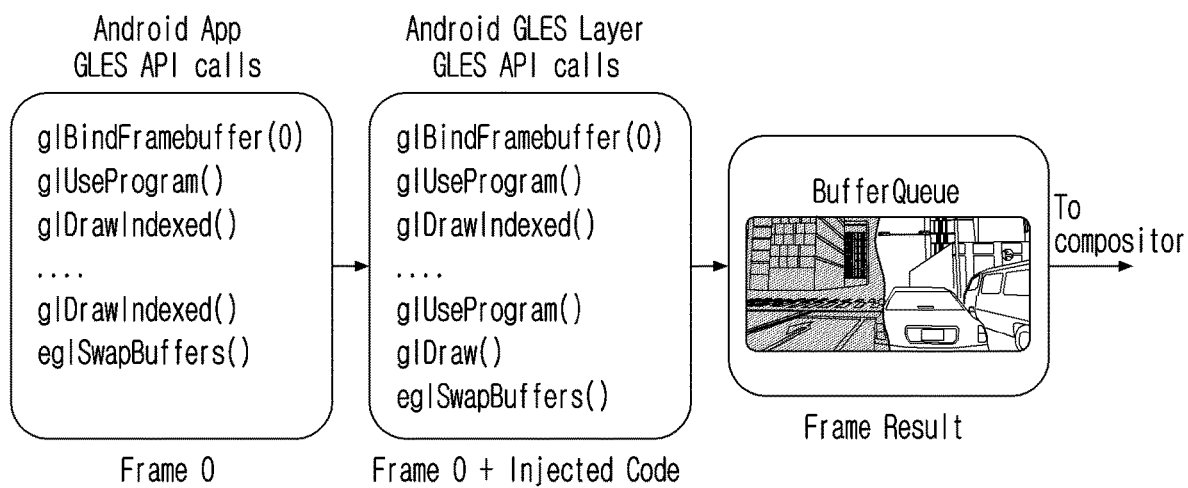
FIGS. 5A, 5B, and 5C further detail applying the non-linear transformation during the rendering of the content using specific types of libraries.

FIG. 5A schematically illustrates an embodiment where OpenGL™ shaders have the transformation(s) injected into their code for implementing the non-linear transformation during the rendering process at step 204A. The last framebuffer which renders to the swapchain is intercepted and a full screen draw call (glUseProgram( ), glDraw( )) is injected before completing the frame. The injected draw call can read the last pixel value from tile memory and apply the non-linear transformation using, for example, GLES™ Extension: ARM_shader_framebuffer_fetch. This can be implemented using Android GLES™ Layers or by modifying the GLES™ driver code. In OpenGL™ the code is executed by the GPU 103 and is stored in a program object in the memory of the GPU (for mobile devices this memory is shared with the CPU). At runtime, the CPU 102 instructs the GPU to use a specific program by calling glUseProgram where the following Draw calls will use the specific compiled program. It will be understood that the injected code can be written to define which non-linear transformation(s) is/are to be applied to the frame and, optionally, to which part(s) of the frame. In some cases, user input may be used to control how the non-linear transformation(s) is/are applied.

Figure 5B:
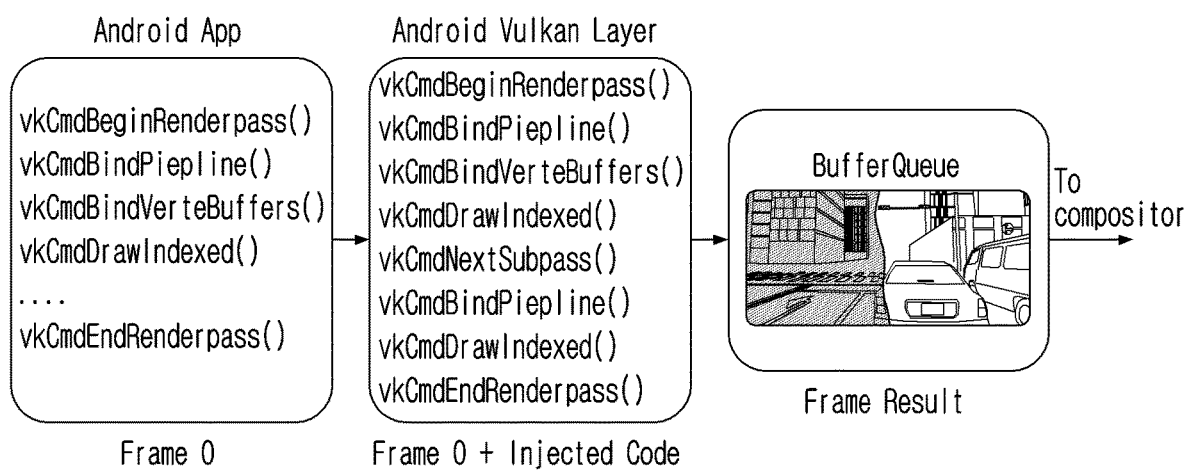

FIG. 5B schematically illustrates an embodiment where the Vulkan™ pipeline is modified for implementing the non-linear transformation during the rendering process at step 204A. The last renderpass which renders to the swapchain image is intercepted and a new subpass injected before completing the renderpass recording. Objects created by the application which are depending on the injected code must be recreated, e.g. VkRenderPass, VkFramebuffer, VkPipeline. The injected subpass (vkCmdNextSubpass( ) vkCmdBindPipeline( ), vkCmdDrawIndexed( )) can read the last pixel value from tile memory and apply the transformation using multipass attachments. This can be implemented using Android Vulkan™ Layers or modifying the Vulkan driver code. Thus, the code for the transformation can be stored in a VkPipeline object and the CPU instructs the GPU to use it by calling vkBindPipeline.

Figure 5C:
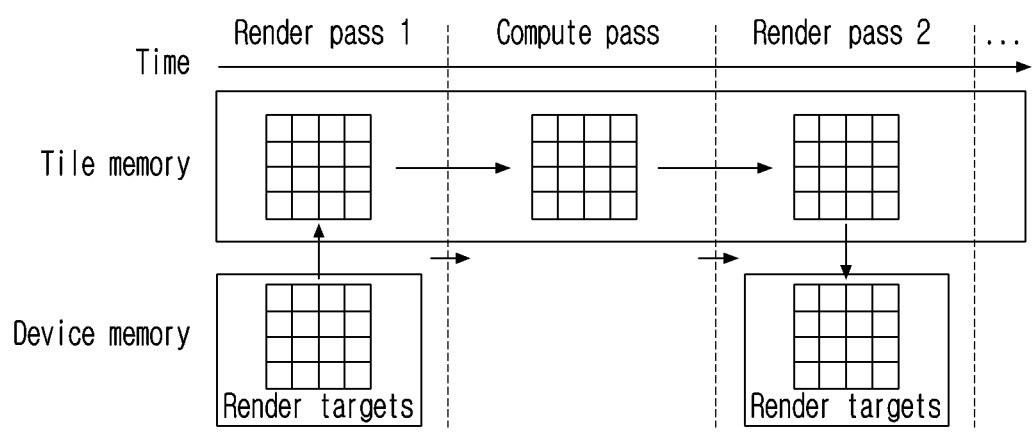

It will be understood that alternative APIs/libraries to the above examples can be used for implementing the non-linear transformation during the rendering process at step 204A. An example comprises Metal2™ for Apple™ computers, which supports tile memory access (Image Blocks) and the non-linear transformation can be implemented in a compute shader as well. This is schematically illustrated in FIG. 5C.

The method 204A may not be available if the application 202 renders frames using the CPU or some other unknown method to the buffer 205. In that case, embodiments may next attempt to use method 208A, i.e. apply the non-linear transformation during the displaying of the rendered frame by the compositor 207.

Figure 6:
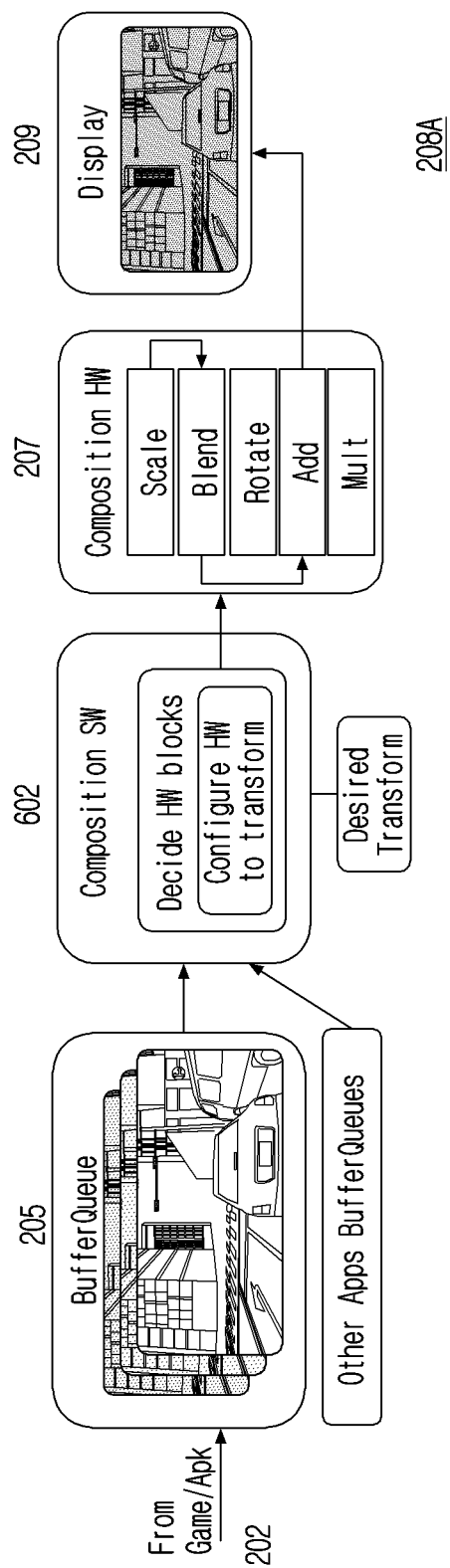
FIG. 6 schematically illustrates an embodiment that applies the non-linear transformation during displaying of the rendered frame by a compositor.

An overview of an embodiment of the method 208A is schematically illustrated in FIG. 6. Rendered images/frames in the buffer queue 205 used by the application 202 (as well as those of other applications) are received by a software component 602 of the compositor 207. The software component decides which hardware units 603 of the compositor 207 should be used to display the frames.

The games/APKs/UI elements when rendering content trigger a delayed VSYNC event at the software component 602 of the compositor. This event triggers a "buildLayerList," that effectively rebuilds the layer stack with new settings (new buffers, or locations, . . . ). This is then passed to the hardware units 603 of the compositor 207, and will notify the software component 602 if the desired composition is possible given the available units. If not, the hardware units 603 of the compositor "rejects" the layer stack, and the software component 602 needs to render some of those layers using the GPU 103/CPU 102, and build the final list of layers. Embodiments effectively "hijack" the BuildLayerList( ) step and add extra work in BuildTransform( ). This extra configuration is relayed to the hardware units 603, and configured in the hardware's blocks. Embodiments modify the software component 602 and can work with any compositor hardware units (as long as it meets the requirements needed to apply the transformations).

Compositors of different computing devices 100 have different capabilities (layers, scales, rotations, blend, mult, etc.). If the device's hardware rejects the Build list, some or all of the layers have to be composed using GPU. Hardware units of the compositor that normally perform alpha blending (mult/division), addition, scale, can be set up in different ways to perform certain non-linear operations/transformations. The cost of this is practically zero because it is done during normal composition; however, there are limits on what type of transformations can be performed, and not all hardware units may support all of them.

Figure 7:
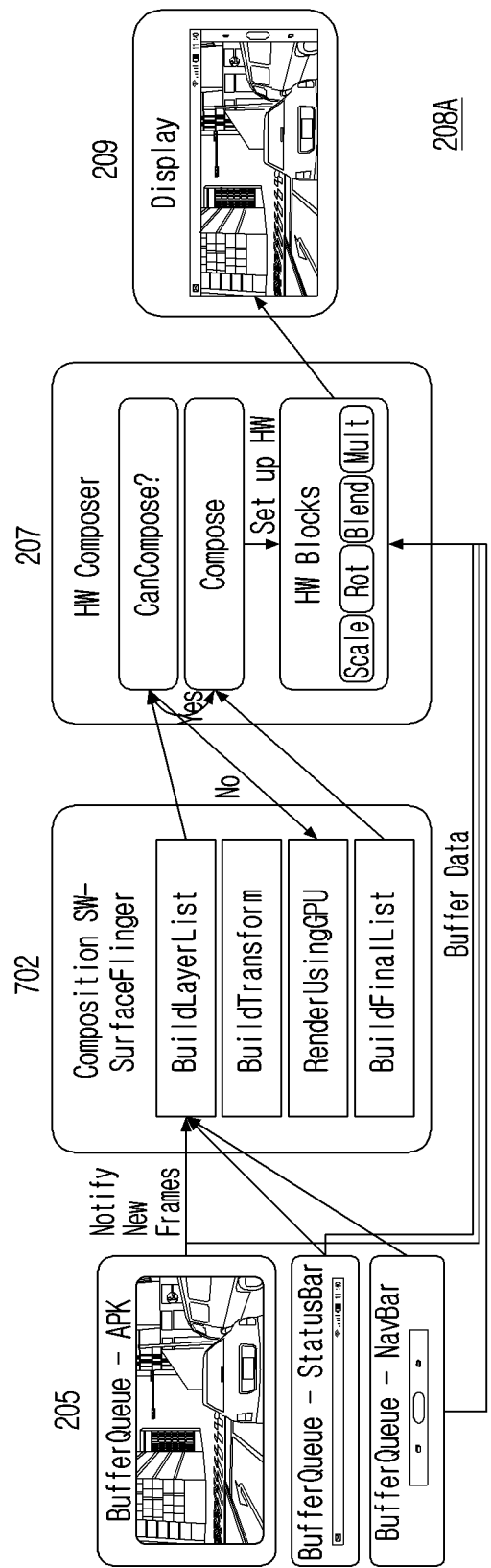
FIG. 7 schematically illustrates an embodiment that applies the non-linear transformation during displaying of the rendered frame by a specific type of compositor.

FIG. 7 schematically illustrates an example of the method 208A specifically for a compositor comprising Android Surfaceflinger™. This composes the final image to be provided to the display driver using specific hardware. Different computing devices 100 have different capabilities (layers, scales, rotations, blend, mult, etc.). If the device's hardware rejects the list, some or all of the layers have to be composed using GPU. The Build of the layer list can be changed to execute certain non-linear transformations. The layer configuration is a set of rules regarding how to compose the final image for display. It contains lists of a buffer (these could be repeated, with the same buffer multiple times), with dimensions, crop region, and output dimensions. It can also contain alpha, blending parameters and other operations. The layer list is not the final image, it is rules for composing the final image. The list is the format both hardware and software components can compose to talk to each other to agree if the image can be composed by one or the other. The software component can compose what the hardware component cannot, as a fallback mechanism.

An example is given below and the skilled person will be able to implement any given non-linear transformation, including using alternatives to Surfaceflinger™:
BuildLayerList-Original:
  StatusBar->Loc(0×0-1920×100)
  NavBar->Rot)(270°)->Loc(1820×0-100×1080)
  Game->Loc(0×0-1920×1080)
  BuildLayerList+Transformation: (equivalent to apply non-linear transformation "out=x*x−0.5x")
  StatusBar->Loc(0×0-1920×100)
  NavBar->Rot)(270°->Loc(1820×0-100×1080)
  Game->Scale(−0.5)->Blend->Loc(0×0-1920×1080)
  Mult (Game, Game)->Loc(0×0-1920×1080)

Figure 8:
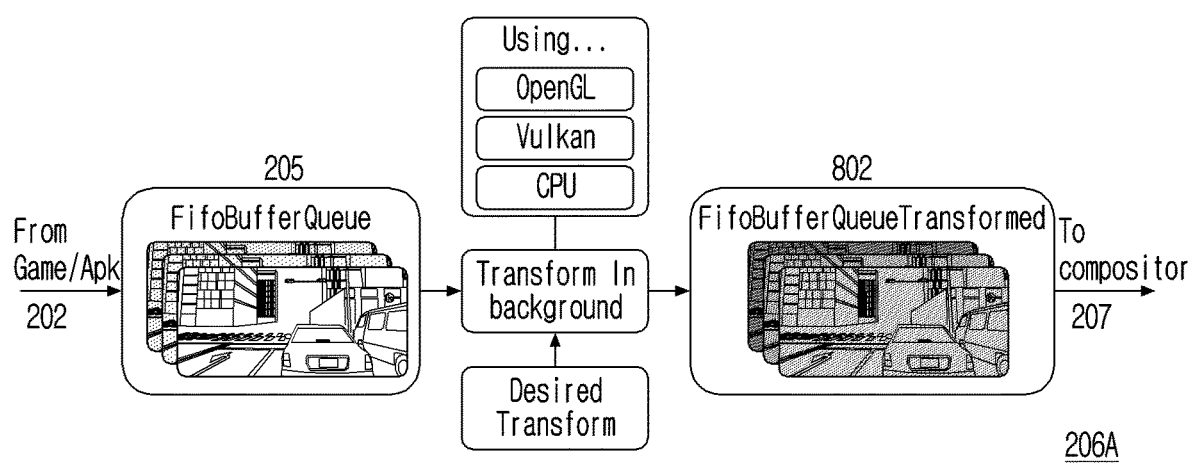
FIG. 8 schematically illustrates an embodiment that applies the non-linear transformation during transferring of the rendered frame to the compositor from a buffer.

The method 208A may not be available, for example, if the application does not use an API/library that uses the GPU 103 to perform rendering. In that case, embodiments may then decide to use method 206A, i.e. apply the non-linear transformation as the rendered image is being transferred from the frame buffer 205 to the compositor 207. The method 206A may be considered to be a "fallback" method so that a desired transformation can still be executed even if the methods 204A and 208A are unavailable. An example embodiment of method 206A is schematically illustrated in FIG. 8.

The frames in the buffer 205 used by the application 202 can be processed in the background to produce a new buffer/queue of transformed images. This can be done using a further data storage area, e.g. a buffer/queue, 802 between the application/APK 202 and the compositor 207. Rendered frames stored in the original queue 205 can be transformed in the background as soon as they are available, and after the transformation they are placed in the new queue 802 that connects with the compositor. The transformations can be executed using GPU 103, CPU 102, and/or any other available processing method/device. The method 206A may be considered relatively power hungry and expensive, but if the device 100 has enough resources, or the transformation is quick (e.g. <=1 ms) then there may not be a noticeable effect on the performance or power usage. In some cases, the non-linear transformation may be applied whilst waiting for a next VSYNC on a compositor queue. A VSYNC (Vertical Sync) signal indicates the time when the display is to be refreshed.

The non-linear transformation may comprise selecting a value from at least one look-up table or similar data structure(s). The at least one look-up table may be configured to transformation a colour space of the application to a target colour space, e.g. a colour space (or style) of another application or a night mode function. The look-up table may be configured to transform a colour space of the application to a colour space that maximises contrast and minimizes colour power. The look-up table may be created by receiving data describing a colour space of an application (e.g. a game) and recursively assigning the colours to the target colour space by similarity of distribution. The non-linear transformation may comprise a function based on at least one neighbouring pixel of a pixel in the frame and a set of weights. The weights may be trained using a Machine Learning technique. The non-linear transformation may comprise a style transfer operation based on a reference image, which may be selected via user input.

Figure 9:
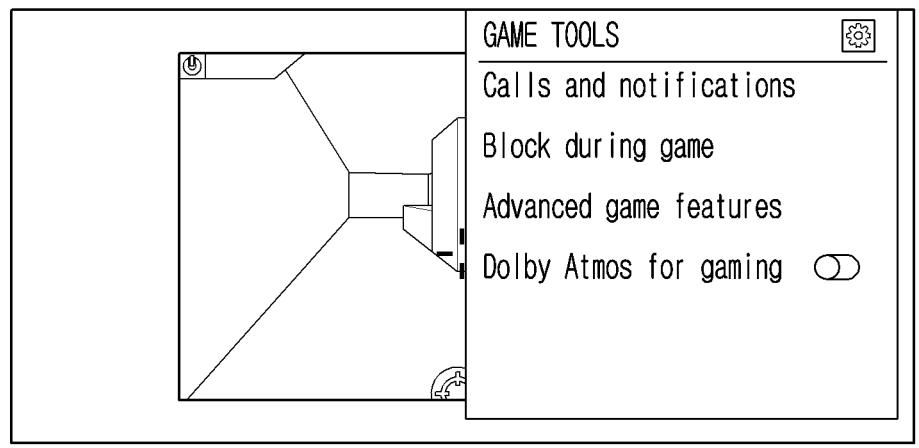
FIGS. 9, 10, and 11 are examples of how the transformation may modify screen displays and user interfaces.
Figure 9:
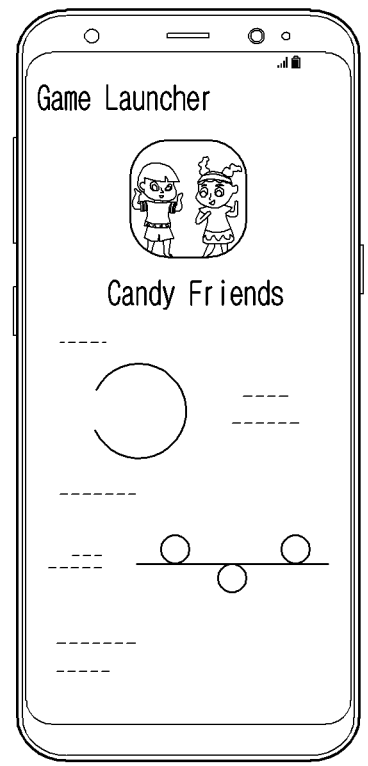

Some embodiments may be implemented as a Plugin Feature inside "Game Tools" on Android™ devices (existing menu shown in FIG. 9). The user can select a new feature from the menu to turn on the application of the non-linear transformation dynamically, e.g. for night mode, styles, or power save.

Figure 10:
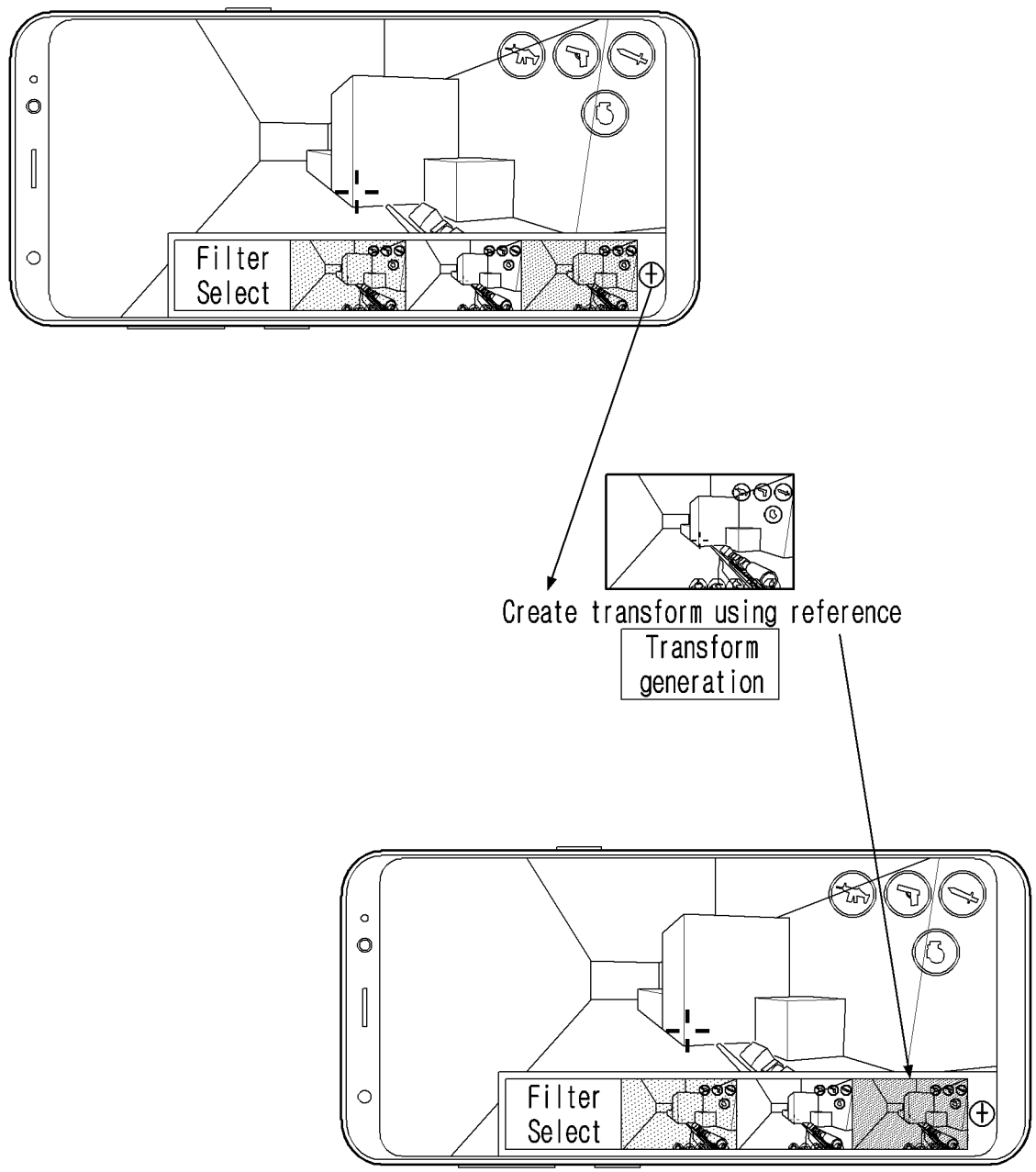

In some embodiments the method may be invoked via a Game Mode user interface on the Android™ operating system and user input may also be received using the Game Mode UI. As schematically illustrated in FIG. 10, embodiments can modify the Game Mode user interface to allow a user to select among a set of predefined transformations and/or permute and generate their own by providing/selecting a reference image that is used. Information regarding the selected reference image can be incorporated as values used by the non-linear transformation to effectively perform a style transfer type of image processing.

Figure 11:
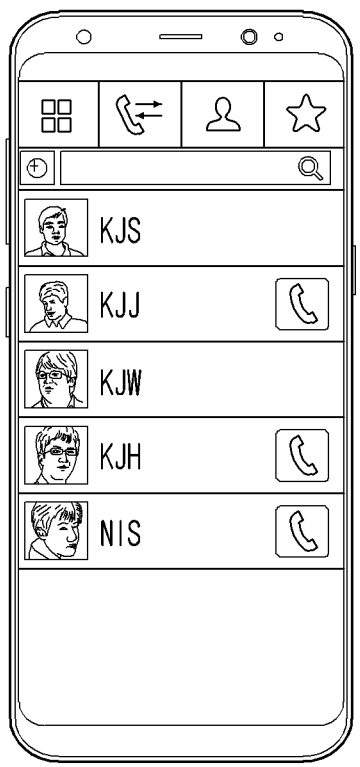
Figure 11:
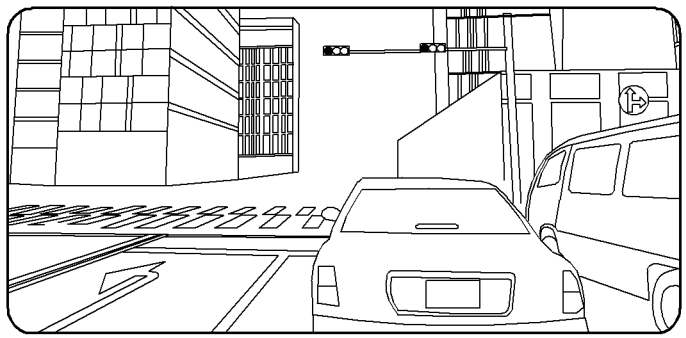
Figure 11:
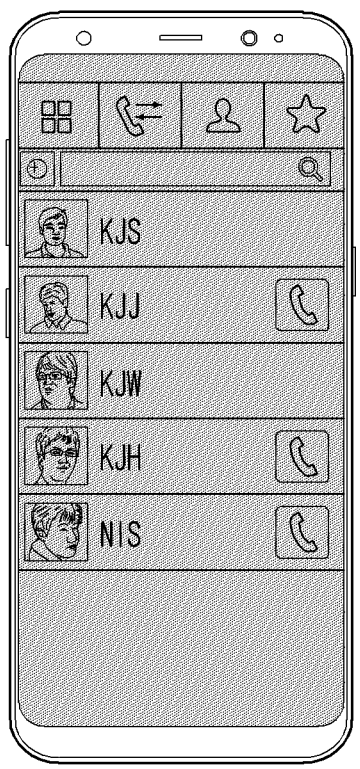
Figure 11:
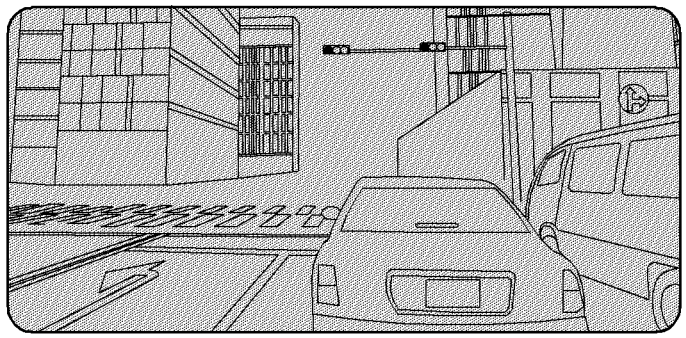

In some embodiments the non-linear transformation may be configured to mimic OS/application appearance, e.g. night mode. Some embodiments may allow a user to selectively apply a night mode non-linear transformation to match a system UI style. For instance, as schematically shown in FIG. 11, the game style may be applied to both the user interface and the game application (shown at 1102), or the power save style may be applied to both the game and the user interface (shown at 1104).

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a computing device of image processing, the method comprising:
   receiving, by the computing device, content from an application;
   rendering, by the computing device, the content into a rendered frame and storing the rendered frame in a frame buffer;
   transferring, by the computing device, the rendered frame from the frame buffer to a compositor; and
   displaying, by the computing device, the rendered frame using the compositor,
   wherein the method further comprises applying, by the computing device, a non-linear transformation to at least part of the rendered frame during the rendering the content into the rendered frame, during the transferring of the rendered frame to the compositor, or during the displaying of the rendered frame by the compositor, and
   wherein the applying of the non-linear transformation to at least part of the rendered frame during the rendering comprises rendering the content into the rendered frame using a rendering function of a library called by the application via an application programming interface (API).

2. The method according to claim 1,
   wherein the applying of the non-linear transformation to at least part of the rendered frame during the rendering comprises:
   applying the non-linear transformation to at least part of the rendered frame stored in the frame buffer, and
   wherein the non-linear transformation is applied using code for performing the non-linear transformation injected into the rendering function of the library.

3. The method according to claim 2, wherein the library comprises GLES™ and the code is injected by:
   intercepting a last framebuffer that renders to swapchain; and
   injecting a full screen draw-call before completing the rendered frame.

4. A method according to claim 2, wherein the library comprises Vulkan™ and the code is injected by:
   intercepting a last renderpass rendering function of the library that renders the rendered frame as a swapchain image; and
   injecting a new subpass rendering function before completing the last renderpass.

5. The method according to claim 1, further comprising:
   determining that the applying the non-linear transformation during the rendering is not possible; and
   then determining whether the applying the non-linear transformation is possible during the displaying of the rendered frame by the compositor.

6. The method according to claim 1, wherein the applying of the non-linear transformation during the displaying of the rendered frame by the compositor comprises:
   receiving the rendered frame from the frame buffer; and
   configuring a hardware unit of the compositor to apply the non-linear transformation to the rendered frame.

7. The method according to claim 6, wherein the configuring of the hardware unit of the compositor to apply the non-linear transformation comprises adding instructions for applying the non-linear transformation to the rendered frame in a BuildLayerList in Android Surfaceflinger™ for execution using BuildTransform in Android Surfaceflinger™.

8. The method according to claim 1, further comprising:
   determining that the applying the non-linear transformation during the rendering is not possible; and
   then determining that the applying the non-linear transformation during the displaying of the rendered frame by the compositor is also not possible; and then
   applying the non-linear transformation during the transferring of the rendered frame to the compositor.

9. The method according to claim 1, wherein the step of applying of the non-linear transformation during the transferring of the rendered frame to the compositor comprises:
   applying the non-linear transformation to the rendered frame stored in the frame buffer;
   storing the transformed rendered frame in a further storage area; and
   transferring the transformed rendered frame from the further storage area to the compositor.

10. The method according to claim 1,
    wherein the non-linear transformation comprises selecting a value from at least one look-up table, and
    wherein the at least one look-up table is configured to transformation a color space of the application to a target color space.

11. The method according to claim 10, wherein values in the look-up table are configured to transform a color space of the application to a color space that maximizes contrast and minimizes color power.

12. The method according to claim 10, wherein the look-up table is created by:
receiving data describing a color space of the application; and
recursively assigning color of the application to a target color space by similarity of distribution.

13. The method according to claim 1, wherein the non-linear transformation comprises a style transfer operation based on a reference image selected via user input.

14. A computing device including:
a display;
memory storing one or more computer programs; and
one or more processors communicatively coupled to the display and the memory,
wherein the one or more computer programs include computer-executable instructions that, when executed by the one or more processors individually or collectively, cause the computing device to:
receive content from an application,
render the content into a rendered frame and store the rendered frame in a frame buffer,
transfer the rendered frame from the frame buffer to a compositor, and
control the display the rendered frame using the compositor,
wherein the one or more computer programs further include computer-executable instructions that, when executed by the one or more processors individually or collectively, cause the computing device to apply a non-linear transformation to at least part of the rendered frame during the rendering of the content into the rendered frame, during the transferring of the rendered frame to the compositor, or during the displaying of the rendered frame by the compositor, and
wherein the applying of the non-linear transformation to at least part of the rendered frame during the rendering comprises rendering the content into the rendered frame using a rendering function of a library called by the application via an application programming interface (API).

15. One or more non-transitory computer-readable storage media storing one or more computer programs including computer-executable instructions that, when executed by one or more processors of a computing device individually or collectively, cause the computing device to perform operations, the operations comprising:
receiving, by the computing device, content from an application;
rendering, by the computing device, the content into a rendered frame and storing the rendered frame in a frame buffer;
transferring, by the computing device, the rendered frame from the frame buffer to a compositor; and
displaying, by the computing device, the rendered frame using the compositor,
wherein the operations further comprise applying, by the computing device, a non-linear transformation to at least part of the rendered frame during the rendering the content into the rendered frame, during the transferring of the rendered frame to the compositor, or during the displaying of the rendered frame by the compositor, and
wherein the applying of the non-linear transformation to at least part of the rendered frame during the rendering comprises rendering the content into the rendered frame using a rendering function of a library called by the application via an application programming interface (API).

* * * * *